United States Patent [19]

Hille et al.

[11] Patent Number: 4,587,283

[45] Date of Patent: May 6, 1986

[54] CEMENT SLURRIES FOR DEEP HOLES, WITH A COPOLYMER CONTENT FOR REDUCING THE WATER LOSS

[75] Inventors: Martin Hille, Liederbach; Wolfgang Friede, Eschborn; Heinz Wittkus, Frankfurt am Main; Friedrich Engelhardt, Frankfurt am Main; Ulrich Riegel, Frankfurt am Main, all of Fed. Rep. of Germany

[73] Assignee: Hoechst Aktiengesellschaft, Fed. Rep. of Germany

[21] Appl. No.: 719,023

[22] Filed: Apr. 3, 1985

Related U.S. Application Data

[63] Continuation of Ser. No. 572,648, Jan. 20, 1984, abandoned.

[30] Foreign Application Priority Data

Jan. 24, 1983 [DE]  Fed. Rep. of Germany ....... 3302168

[51] Int. Cl.$^4$ .............................................. C08J 3/00
[52] U.S. Cl. ........................................ 524/3; 523/130; 524/4; 524/5; 524/547; 524/548; 524/555; 524/556; 524/560; 524/566; 526/287; 526/288; 166/293; 166/294; 166/295; 252/8.5 A; 252/8.55 B
[58] Field of Search .................. 166/293, 294, 295; 523/130; 524/3, 4, 5, 547, 548, 555, 556, 560, 566

[56] References Cited

U.S. PATENT DOCUMENTS

| Re. 29,595 | 3/1978 | Adams et al. ............ 260/29.6 S |
|---|---|---|
| 3,465,825 | 9/1969 | Hook et al. ............ 166/293 |
| 3,936,408 | 2/1976 | Adams et al. ............ 260/29.6 S |
| 3,994,852 | 11/1976 | Adams et al. ............ 260/29.6 S |
| 4,015,991 | 4/1977 | Persinski et al. ............ 106/90 |
| 4,048,077 | 9/1977 | Engelhardt et al. ............ 252/8.5 C |
| 4,053,323 | 10/1977 | Adams et al. ............ 106/100 |
| 4,309,523 | 1/1982 | Engelhardt et al. ............ 526/240 |
| 4,340,525 | 7/1982 | Hübner et al. ............ 524/5 |
| 4,357,245 | 11/1982 | Engelhardt et al. ............ 252/8.5 C |

*Primary Examiner*—Joseph L. Schofer
*Assistant Examiner*—J. M. Reddick
*Attorney, Agent, or Firm*—Connolly and Hutz

[57] ABSTRACT

Cement slurries for deep holes, with a content of copolymers which are composed of 5-95% by weight of groups of the formula

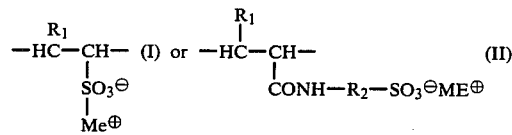

in which
$R_1$ is hydrogen or methyl,
$R_2$ is $C_2$-$C_{10}$-alkylene and
Me is ammonium, lithium, sodium or potassium, of 5-60% by weight of groups of the formula

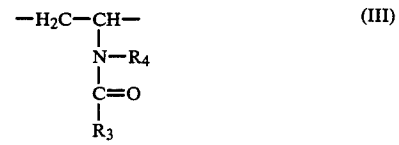

in which
$R_3$ is hydrogen, —$CH_3$ or $C_2H_5$ and
$R_4$ is —$CH_3$ or $C_2H_5$, or
$R_3$ and $R_4$ together are a propylene group which, with incorporation of the radical

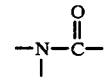

forms a pyrrolidone radical, and of 0-90% by weight of groups of the formula

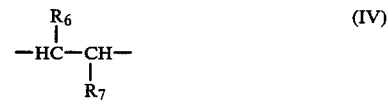

in which
$R_6$ is hydrogen or methyl and
$R_7$ is carboxamido, carboxyl, cyano or carbomethoxy.

These copolymers reduce the water loss of cement slurries which are required for deep holes.

4 Claims, No Drawings

CEMENT SLURRIES FOR DEEP HOLES, WITH A COPOLYMER CONTENT FOR REDUCING THE WATER LOSS

This application is a continuation of Ser. No. 06/572,648 filed Jan. 20, 1984, now abandoned.

The present invention relates to the use of copolymers for reducing the water loss of cement slurries which are to be pumped. These compounds are of very special importance for cementing deep holes drilled for geothermal heat, crude oil and natural gas. The technology of drilling and completing deep wells has nowadays reached a very high level of perfection. After drilling down a certain depth, a casing string of pipes which are screwed together is introduced into the drill hole. A cement slurry which subsequently sets is then pumped into the annular space between the rock wall and the casing string. By means of this cement shell, the casings are fixed and all formations, through which the well has passed, are sealed. With increasing depth of the drill holes, increasingly stringent demands have to be met by these cement slurries. Various compositions of cement, water and additives have been developed for this purpose.

There are 3 important groups of additives to be distinguished:

1. Retarders which extend the setting time, so that the cement slurry remains sufficiently fluid for the whole pumping phase, which amounts to several hours in the case of very deep wells. The best-known products of this type are lignosulfonates and carboxymethyl-hydroxyethylcelluloses.

2. Dispersants which homogeneously disperse the cement slurries and reduce the viscosity, so that their pumping properties are improved. As such products, condensation products of mononaphthalenesulfonates and formaldehyde are described in U.S. Pat. No. 3,465,825, and N-sulfoalkyl substituted acrylamides are described in U.S. Pat. No. 4,053,323. The lignosulfonates and carboxymethyl-hydroxyethylcellulose ethers also have a dispersing action on the cement slurries, in addition to the retarding action.

3. Water loss reducers which reduce the water loss from the cement slurries into porous formations while the cement slurries are being pumped into the annular space between the casing and the well wall. The best-known products of this type are fully synthetic copolymers of acrylate/acrylamide according to German Pat. No. 2,830,528 and block polymers of vinylpyrrolidone and acrylamide according to British Pat. No. 1,473,767, and semi-synthetic carboxymethyl-hydroxyethylcellulose ethers and hydroxyethylcellulose ethers.

The last-mentioned additives are of particular importance since pumpable cement slurries which are composed only of cement and water lose large volumes of water when they flow past porous rock strata during cementing of the well. The alkaline water causes clays in the formations to swell and, with $CO_2$ from the natural gas or crude oil, forms precipitates of potassium carbonate. These two effects reduce the permeability of the oil deposits and also reduce the ultimate production rates. As a result of the water loss, the cement, which has been adjusted above ground to the optimum for the particular cementation, suffers an increase in viscosity which is difficult to calculate and makes the pumping process more difficult. The water loss to porous formations can lead to an inhomogeneous cement mass which does not solidify homogeneously and is permeable to gases, to liquid hydrocarbons and to waters. This can lead to the escape of natural gas or crude oil through the annular space, filled with porous cement, into other formations and, in extreme cases, even up to ground level. Moreover, aggressive saline waters and gases can act through the porous cement on the casings and corrode the latter.

To ensure technically perfect cementation of the well, it is necessary to reduce the water loss of the cement slurries used. The water loss is here measured comparatively by means of a filter press according to API Code 29. In this case, the filter area is $45.8 \pm 0.7$ $cm^2$, the excess pressure is $7 \pm 0.7$ atmospheres gage and the filtration time is 30 minutes. More recently, measurements of the water loss have also been carried out more and more frequently by means of the high-temperature and high-pressure filter press (Baroid No. 387). Normally, filtration takes place under a differential pressure of 35 bar, and the temperature is adjusted to that applying in practice.

The semi-synthetic cellulose ethers of the hydroxyethylcellulose type and, in some cases, also carboxymethyl-hydroxyethylcellulose ethers have hitherto gained widest acceptance for reducing the water loss of cement slurries. Their purposeful use is limited by the temperatures to which the cement slurries are exposed. The activity drops steeply starting at temperatures above 100° C. and can then no longer be compensated even by larger quantities used. Fully synthetic copolymers, composed of acrylamide and acrylic acid of vinylpyrrolidone, have been unable to gain acceptance in deeper wells with higher bottom temperatures. Particularly if saline waters are used for formulating cement slurries, they show a rather poor activity which further declines at higher temperatures. Saline waters are usual in off-shore drilling and are necessary for cementations in salt strata. These products fail completely if $CaCl_2$ is used as a setting accelerator. The state of the art shows that there is at present a gap in the range of products for reducing the water loss of cement slurries for deep wells, in particular if the cement slurries are exposed to temperatures above 100° C. and are formulated with saline waters.

It has now been found that these water losses in cement slurries for deep holes can be reduced when the copolymers described below are added to the cement slurry. The subject of the invention are thus cement slurries composed of water and cement, which in addition also comprise a copolymer composed of 5–95% by weight of groups of the formula

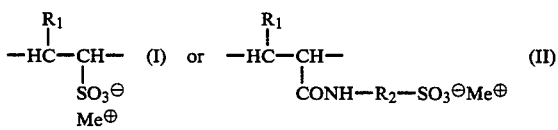

in which
 $R_1$ is hydrogen or methyl,
 $R_2$ is $C_2$–$C_{10}$-alkylene and
 Me is ammonium, lithium, sodium or potassium, of 5–60% by weight of groups of the formula

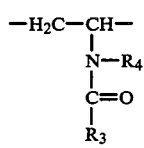

in which
$R_3$ is hydrogen, —$CH_3$ or —$C_2H_5$ and
$R_4$ is —$CH_3$ or —$C_2H_5$, or
$R_3$ and $R_4$ together are a propylene group, which, with incorporation of the radical

forms a pyrrolidone radical, and of 0–90% by weight of groups of the formula

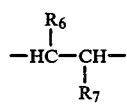

in which $R_6$ is hydrogen or methyl and
$R_7$ is carboxamido, carboxyl, cyano or carbomethoxy, the order of the components being arbitrary.

The carboxyl groups can here result from subsequent saponification of the amides, nitriles and ethers, or they can be copolymerized directly in the form of free acrylic acid. Those copolymers are preferred which are composed of 30–80% by weight of groups of the formulae I and II, of 10–30% by weight of groups of the formula III and of 10–50% by weight of groups of the formula IV. The molecular weights of these copolymers are 250,000 to 6,000,000, preferably 500,000 to 2,000,000. They have previously been described in German Offenlegungsschrift No. 2,931,897 and German Auslegeschrift No. 2,444,108. The copolymers described are added to the cement slurries in concentrations from 0.1 to 3%, preferably 0.3 to 2%.

The copolymers to be used can be prepared in a manner known per se by reacting the monomers at temperatures between about −10° and +80° C., preferably at 20° to 60° C., in the presence of suitable polymerization catalysts. The polymerization advantageously takes place in aqueous phase, but aqueous solutions of water-miscible organic solvents, for example methanol, ethanol, tert.butyl alcohol, tetrahydrofuran or dimethylformamide can also be used, if desired, as the polymerization medium. Possible polymerization catalysts are above all per compounds, such as benzoyl peroxide, acetyl peroxide, tert.butyl hydroperoxide or alkali metal and ammonium peroxydisulfate or even redox systems, such as methyl N-p-toluenesulfonylmethylcarbamate/ammonium peroxydisulfate. In some cases, an addition of co-catalysts, such as dibutylamine hydrochloride or traces of copper salts can also be advantageous. Compounds such as, for example, diazoisobutyronitrile can also be added as polymerization initiators, if desired.

On the basis of formulae I, II, III and IV, the following compounds can above all be used as the monomers:
I. Vinyl- or allyl-sulfonic acids or alkali metal or ammonium salts thereof,
II. 2-acrylamido-2-methyl-propane-3-sulfonic acid,
III. N-vinyl-N-methylacetamide or N-vinylpyrrolidone, and
IV. acrylamides, acrylic acid, acrylonitriles or methyl acrylates, or the corresponding methacrylic compounds.

The copolymers are obtained as viscous, preferably aqueous solutions which can be used in this form. To prepare saponification products of the copolymers, alkali metal hydroxide is added in the required quantities to the polymer solutions, and the mixture is heated to elevated temperatures, preferably up to about 85 to 120° C., until the desired degree of saponification has been reached.

If it is intended to produce the polymers in the solid form, the polymer solutions can be subjected to a conventional evaporation process or drying process, advantageously to spray-drying or drum-drying.

The copolymers are used in cement slurries which contain 20–85% by weight, preferably 30–70% by weight, of water, relative to the dry cement employed.

EXAMPLES

The examples which follow show the mode of action of the compounds according to the invention in the very diverse and in some cases highly saline cement slurries.

EXAMPLE 1

A copolymer composed of p1 50% by weight of acrylamide
27.5% by weight of N-vinyl-N-methylacetamide
22.5% by weight of Na vinylsulfonate
Cement mix:
250 g of water saturated with NaCl
500 g of class G cement
2.5 g of copolymer (0.5%, relative to cement)
Water loss=8.4 cm³ according to API
Viscosity=160 cp according to Fann at 3 rpm
The water loss was determined here, as also in the following examples, by means of the API filter press mentioned above.

EXAMPLE 2

Copolymer composed of
75% of partially saponified acrylamide
15% of N-vinyl-N-methylacetamide
10% of acrylamidomethyl-propanesulfonic acid
Cement mix:
194 g of water, 3.5% of NaCl
440 g of class G cement
3.3 g of copolymer (0.75%, relative to cement)
Water loss=11.3 cm³ according to API
Viscosity=about 500 cp according to Fann at 3 rpm EXAMPLE 3a Copolymer composed of:
65% by weight of acrylamidomethyl-propanesulfonic acid
20% by weight of N-vinyl-N-methylacetamide
15% by weight of acrylamide
Cement mix:
450 g of water, saturated with NaCl
600 g of class D cement
12 g of copolymer (2%, relative to cement)
Water loss after 4 hours' aging at 80° C.=25 cm³ according to API Viscosity after 4 hours' aging at 80° C.=200 cp according to Fann at 3 rpm EXAMPLE 3b Copolymer as in 3a
Cement mix as in 3a plus 12 g of bentonite (2%, relative to cement).

Water loss after 4 hours' aging at 80° C.=12.5 cm³ according to API

Viscosity after 4 hours' aging at 80° C.=800 cp according to Fann at 3 rpm.

High-temperature high-pressure water loss measurement after 2 hours' aging at 160° C., measured at 80° C. and 35 bar differential pressure.

| Example 3a | Example 3b |
|---|---|
| 22 cm³ | 14 cm³ |

EXAMPLE 4a

Copolymer as in 3
Cement mix:
500 g of water
600 g of class D cement
12 g of copolymer (2%, relative to cement)

Water loss after 4 hours' aging at 80° C.=9.4 cm³ according to API

Viscosity after 4 hours' aging at 80° C.=300 cp according to Fann at 3 rpm

EXAMPLE 4b

Copolymer as in Example 3a
Cement mix as in Example 4a plus 12 g of bentonite (2%, relative to cement)

Water loss after 4 hours' aging at 80° C.=4.1 cm³ according to API

Viscosity after 4 hours' aging at 80° C.=1,200 cp according to Fann at 3 rpm.

The examples demonstrate the wide application range of the compounds according to the invention in cement slurries, with respect to the salinities of the mixing waters and the water/cement ratios. The reduction in water loss of the cement slurries is the main effect, but the copolymer of Examples 3 and 4 also has a considerable activity in retarding the setting. Thus, the comparative samples without copolymer had already solidified after 2 hours at 80° C. By means of varying the monomer ratios in the copolymers, the latter can be adapted to the demands of the very diverse cement slurries. For cement slurries which are not exposed to elevated temperatures and where only the water loss is to be reduced to a low value, copolymers according to Examples 1 and 2 are used. If the cement slurry is pumped down around the casing string of a deep well, in order to form a sheath of cement stone, it being necessary for the water loss to be very low and the setting time to be retarded, it is necessary to use a copolymer according to Examples 3 and 4.

According to Examples 3 and 4, the water loss can be improved by the addition of small quantities of bentonite. The maximum reduction in the water loss by means of the copolymers according to the invention is a function of the temperature, the time and the intensity of mixing. This applies in particular to copolymers according to Examples 3 and 4. Nevertheless, when these are used in cement slurries for deep and hot wells, the time taken for pumping-down, the resulting mixing intensity and the elevated temperature are sufficient for the greatest possible reduction in water loss.

We claim:

1. A cement slurry comprised of water and cement, which comprises a copolymer comprised of:
(a) 10–80% by weight of groups of the formula

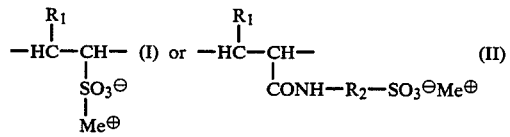

in which
$R_1$ is hydrogen or methyl,
$R_2$ is $C_2$-$C_{10}$-alkylene and
Me is ammonium, lithium, sodium or potassium;
(b) 10–60% by weight of groups of the formula

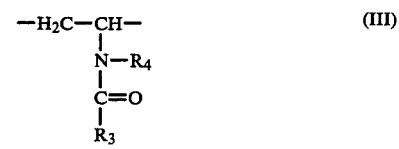

in which
$R_3$ is hydrogen, —$CH_3$ or —$C_2H_5$ and
$R_4$ is —$CH_3$ or —$C_2H_5$; and
(c) 0–75% by weight of groups of the formula

in which
$R^6$ is hydrogen or methyl and
$R^7$ is carboxamido, carboxyl, cyano or carbomethoxy.

2. A cement slurry as claimed in claim 1, which comprises a copolymer comprised of: (a) 30–80% by weight of groups of the formula I or II; (b) 10–30% by weight of groups of the formula III and (c) 10–50% by weight of groups of the formula IV.

3. A cement slurry as claimed in claim 1, which comprises 0.1–3% by weight of the copolymer.

4. A settable cement slurry comprised of water and settable cement, which comprises a copolymer comprised of:
(a) 5–95% by weight of groups of the formula

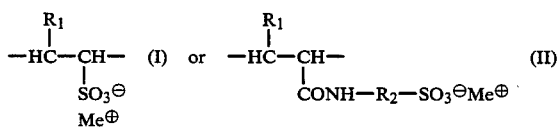

in which
$R_1$ is hydrogen or methyl,
$R_2$ is $C_2$-$C_{10}$-alkylene and
Me is ammonium, lithium, sodium or potassium;
(b) 5–60% by weight of groups of the formula

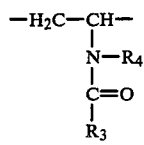 (III)
in which
R₃ is hydrogen, —CH₃ or —C₂H₅ and
R₄ is —CH₃ or —C₂H₅; and
(c) 0–90% by weight of groups of the formula
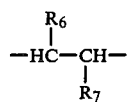 (IV)
in which
R₆ is hydrogen or methyl and
R₇ is carboxamido, carboxyl, cyano or carbomethoxy.
* * * * *